US006778310B2

(12) United States Patent
Puleo

(10) Patent No.: US 6,778,310 B2
(45) Date of Patent: Aug. 17, 2004

(54) METHOD AND SYSTEM FOR GENERATING NARROW OPTICAL PULSES

(75) Inventor: Mario Puleo, Borgosesia (IT)

(73) Assignee: Agilent Technologies, Inc., Palo Alto, CA (US)

( * ) Notice: Subject to any disclaimer, the term of this patent is extended or adjusted under 35 U.S.C. 154(b) by 105 days.

(21) Appl. No.: 10/214,849

(22) Filed: Aug. 8, 2002

(65) Prior Publication Data

US 2003/0086645 A1 May 8, 2003

(30) Foreign Application Priority Data

Nov. 5, 2001 (EP) ............................................. 01309348

(51) Int. Cl.$^7$ .......................... H04B 10/155; G02B 6/26
(52) U.S. Cl. ...................................... 359/264; 359/239
(58) Field of Search ................................ 359/264, 237, 359/239; 385/2; 398/94

(56) References Cited

U.S. PATENT DOCUMENTS

2002/0141027 A1 * 10/2002 LaGasse et al. ............ 359/237

FOREIGN PATENT DOCUMENTS

| WO | WO 99/08406 | 2/1999 |
| WO | WO 01/48596 | 7/2001 |

OTHER PUBLICATIONS

Carrasco Comes, N., Examiner. European Search Report, Application No. EP 01 30 9348, dated Apr. 5, 2002.

Frogberg N.M. et al. "Pulse Generation by Harmonic Modulation of an Integrated DBR Laser–Modulation," Electronics Letters, vol. 30, No. 8, Apr. 14, 2994, pp. 650–651, XP006000434.

* cited by examiner

Primary Examiner—Scott J. Sugarman
Assistant Examiner—Richard Hanig

(57) ABSTRACT

Optical pulses at a given repetition rate (f) are obtained by modulating an optical signal by means of a Mach-Zehnder modulator. The modulator is driven by means of a driving signal including, in addition to a sinusoidal component at a frequency (f/2) half the repetition rate (f) of the pulses, at least one odd harmonic of the sinusoidal component. Very short optical pulses can thus be generated without giving rise to undesired side effects such as ringing in pulse tails.

12 Claims, 3 Drawing Sheets

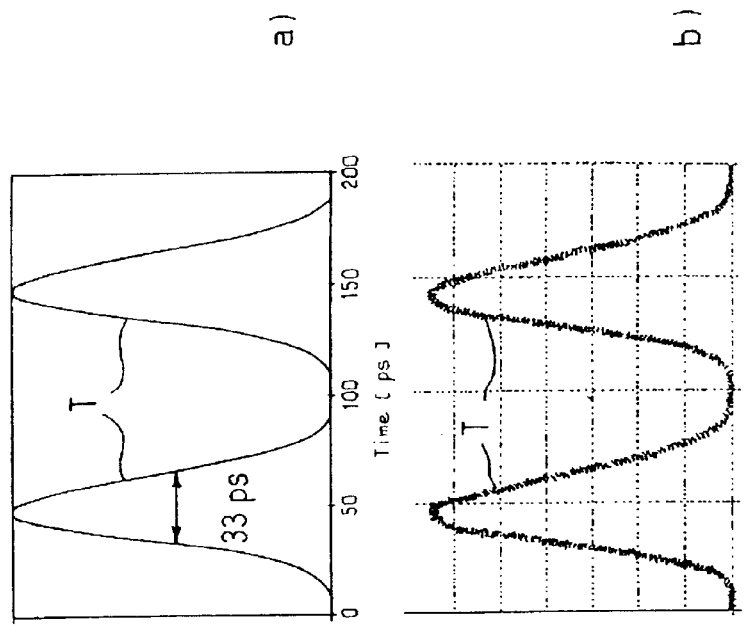
Fig_1
PRIOR ART
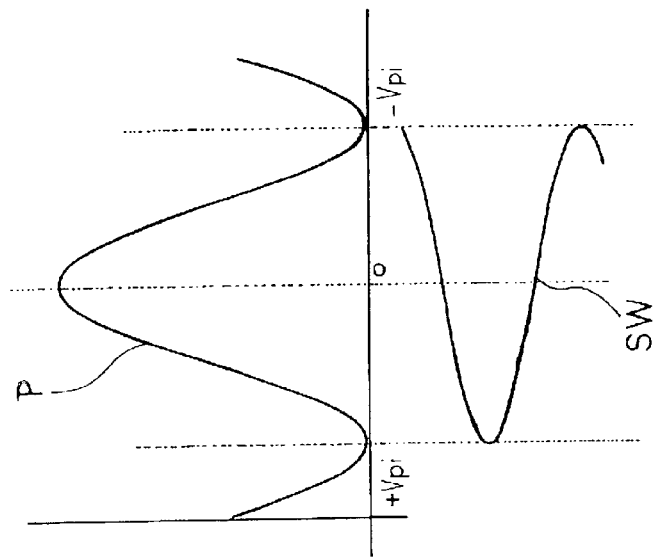
Fig_2

METHOD AND SYSTEM FOR GENERATING NARROW OPTICAL PULSES

FIELD OF THE INVENTION

The present invention relates to the generation of narrow optical pulses. More specifically, the invention relates to techniques for generating optical pulses at a given repetition rate or frequency f by driving a Mach-Zehnder (M-Z) modulator with a sine wave having a frequency f/2 that is one half of the desired repetition rate f and an amplitude that is twice the amplitude required for switching the M-Z modulator output from minimum to maximum transmission ($V_{pi}$).

DISCUSSION OF THE BACKGROUND ART

The basic principle of operation of such a solution, which is widely known in the art, is schematically depicted in FIGS. 1 and 2 of the annexed drawings.

Specifically, in the lower portion of FIG. 1 reference SW designates a modulating sine wave oscillating between $-V_{pi}$ and $+V_{pi}$ (another current designation for $V_{pi}$ being $V_\pi$) while P generally designates the output optical pulse generated by the M-Z modulator.

In FIG. 2, the upper diagram shows the theoretical time behaviour of the pulses expected to be generated by resorting to such a technique. The diagram of FIG. 2b shows corresponding experimental results, which are in good agreement with the theoretical predicted results.

The prior art technique considered here enables pulses to be generated with a nearly fixed duty cycle of about 35%. A typical half-amplitude width value for such pulses is in the range of 33 ps with a repetition period (i.e. the period T=1/f where f is the repetition rate) of 100 ps. Narrower pulses can be obtained by increasing the modulation amplitude, but this gives rise to undesired ringing in pulse tails.

The present invention aims at providing an improved solution enabling narrower pulses be obtained while avoiding the disadvantages encountered when such narrower pulses are attempted to be generated by prior art techniques.

SUMMARY OF THE INVENTION

According to the present invention such an object is achieved by means of a method having the features set forth in the annexed claims. The invention also relates to the corresponding system.

By means of the invention, pulse width can be reduced from the typical value of 35% of the repetition period ideally to 0 and in practice to values in the range of about 15% the repetition period. This is particularly advantageous in long haul optical transmission and in optical systems operating at very high transmission rates e.g. in the range of 40 Gbit/s and above.

The invention provides for the pulse width being made selectively adjustable, while totally avoiding pulse ringing.

Essentially, the solution of the invention is based on the concept of adding to the driving signal at frequency f/2 its odd harmonics (i.e. 3/2f, 5/2f, . . . ) with proper amplitudes and phases.

BRIEF DESCRIPTION OF THE DRAWING

The invention will now be described, by way of example only, in connection with the annexed figures of drawing, wherein:

FIGS. 1 and 2, relating to the prior art, have been already discussed in the foregoing.

DETAILED DESCRIPTION OF THE PREFERRED EMBODIMENT

Figure 4:
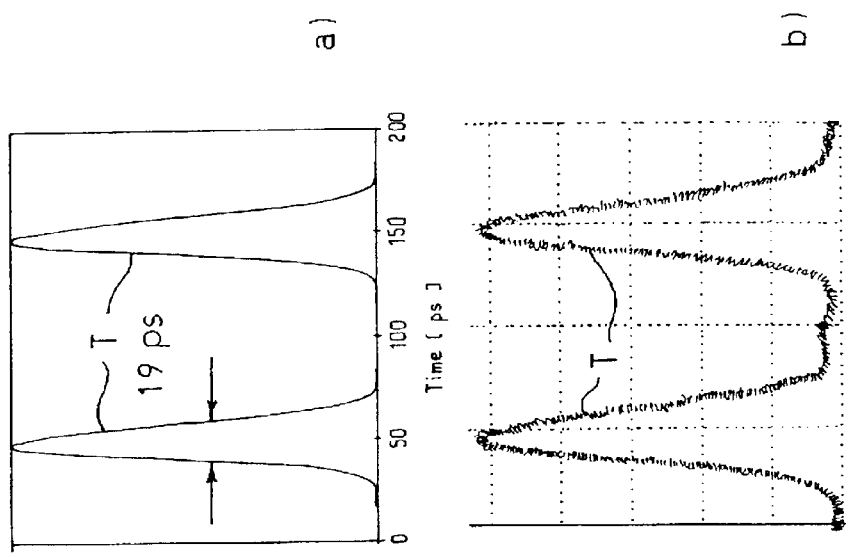
FIGS. 3 and 4 show the advantages of the solution of the invention in direct comparison with the prior art arrangement of FIGS. 1 and 2.
Figure 3:
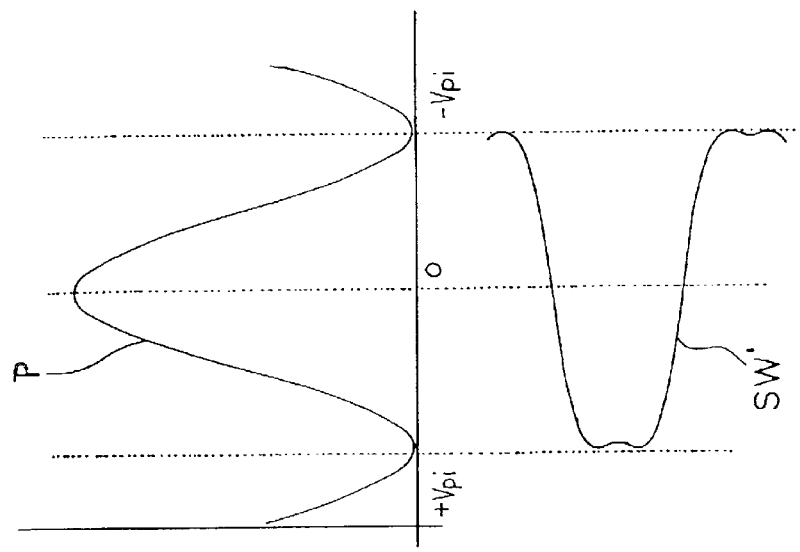

Specifically, in FIGS. 3 and 4 (which essentially correspond to FIGS. 1 and 2, respectively) a driving signal SW' is shown adapted to be applied to a M-Z modulator according to the basic principles already described in the foregoing in connection with FIGS. 1 and 2.

In the case of the arrangement of the invention, the spectral contents of driving signal SW' include, in addition to a basis sinusoidal component at a frequency f/2 that is half the repetition rate f of the pulses, a third harmonic term at a frequency (3/2)f.

In that way, pulses with a repetition period of 100 ps can be produced as shown in the diagrams designated a) and b) of FIG. 4 which are significantly narrower (i.e. about 19 ps vs. 33 ps half-amplitude width) than those shown in FIG. 2.

Again, experimental results (FIG. 4b) appear to be in good agreement with the theoretical model (FIG. 4a).

Figure 5:
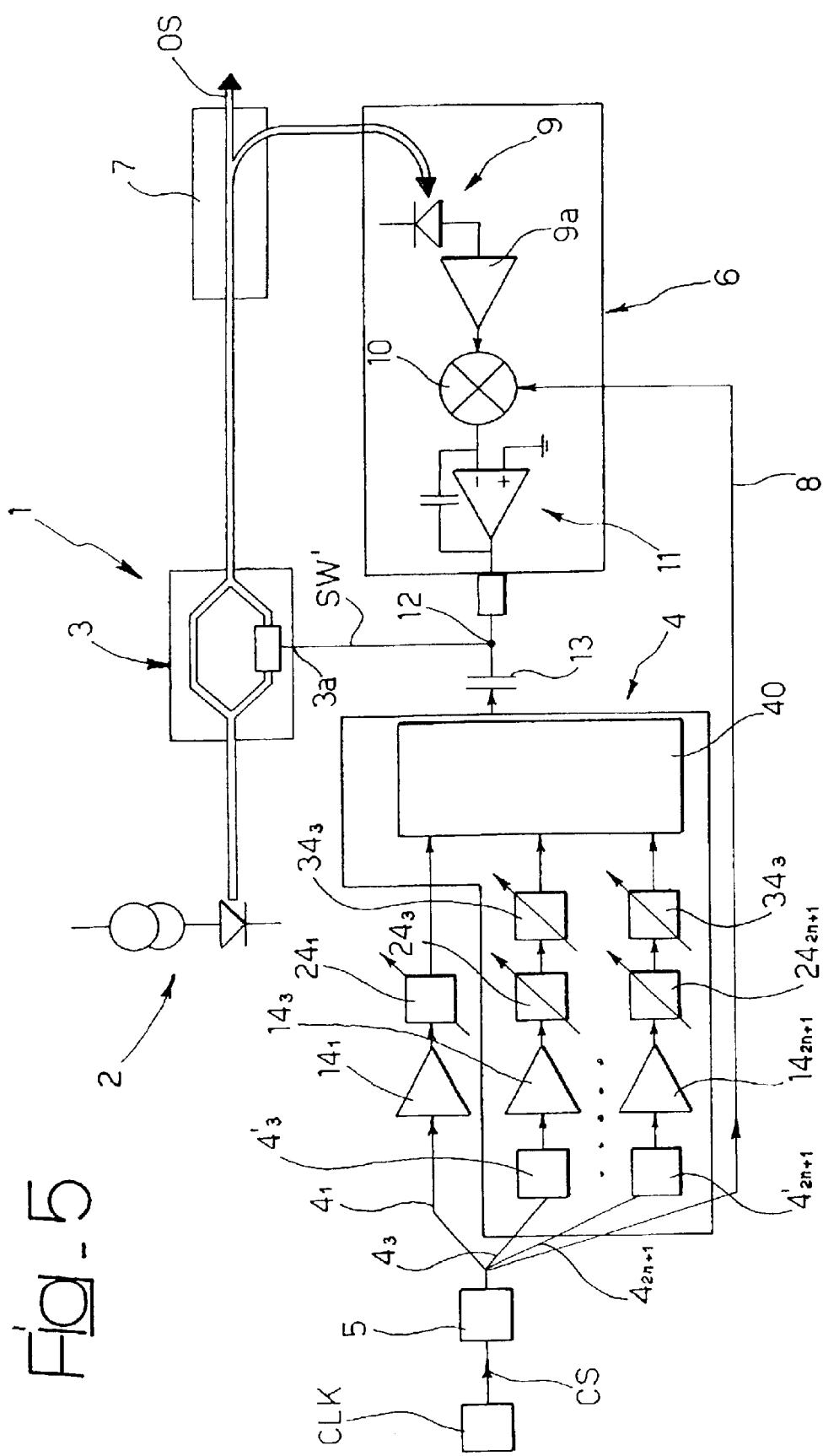
FIG. 5 is a block diagram showing the typical layout of an optical pulse source according to the invention.

In the block diagram of FIG. 5, reference 1 designates overall an arrangement for generating short optical pulses according to the invention starting from radiation generated by a laser source 2 such as a CW laser.

In a preferred embodiment of the invention source 2 is a high power DFB laser.

Radiation from laser source 2 is fed to a Mach-Zehnder modulator 3 such as a $LiNbO_3$ M-Z modulator of a known type.

M-Z modulator 3 is provided with a modulation port 3a for receiving a driving signal SW' produced by means of generator circuit 4 to be described in greater detail in the following.

Optical pulses from M-Z modulator 3 constitute an output signal OS comprised of a train of ultra-short optical pulses with a repetition period T in the range of 100 ps. In a number of experimental set up arrangements successfully tested by the applicant a repetition period T was chosen corresponding to a 1/9953.28 MHz clock signal.

The frequency of such a clock signal CS, generated by an external clock source designated CLK, is divided by two in a divider 5 to be fed to generator 4.

Reference numeral 6 designates overall a bias controller circuit for M-Z modulator 3. Bias controller 6 is driven by a portion of the pulsed output signal split from signal OS by means of a 5/95 optical coupler 7. Bias controller 6 also receives on a line 8 the clock signal CS divided by two in divider 5.

Generator 4 is essentially comprised of a plurality of signal paths branching from the output of divider circuit 5 and leading to an RF combiner 40.

The signal paths in question include a basis path $4_1$ including an amplifier $14_1$ followed by an attenuator $24_1$.

This arrangement enables a first (basic or fundamental) sinusoidal component of driving signal SW' to be fed to combiner 40 at the frequency f/2.

The or each of additional paths $4_3, \ldots, 4_{2n+1}$ is comprised of:

a harmonic generator circuit $4'_3, \ldots, 4'_{2n+1}$,
an amplifier $14_3, \ldots, 14_{2n+1}$,
an adjustable attenuator $24_3, \ldots, 24_{2n+1}$, and
an adjustable phase shifter $34_3, \ldots, 34_{2n+1}$.

The or each of the additional signal paths $4_3, \ldots, 4_{2n+1}$ enables a respective signal component at a frequency $(3/2)f, \ldots, ((2n+1)/2)f$ to be fed to a combiner 40 with a given amplitude and phase relationship to the basic component at frequency f/2 which propagates along signal path $4_1$.

Specifically, the relative amplitudes of the basic component at frequency f/2 and the odd harmonic component(s) at frequencies $(3/2)f, \ldots, ((2n+1)/2)f$ can be adjusted selectively and precisely by acting on attenuators $24_1, 24_3, \ldots, 24_{2n+1}$.

Similarly, the phase relationships of the odd harmonic component(s) at frequencies $(3/2)f, \ldots, ((2n+1)/2)f$ to the basic component at frequency f/2 can be adjusted by acting on phase shifters $34_3, \ldots, 34_{2n+1}$.

Odd harmonic generators $4'_3, \ldots, 4'_{2n+1}$ are based on circuitry which is conventional in the art and can be comprised of e.g. a comb generator followed by a proper microwave demultiplexer.

Those skilled in the art will promptly appreciate that odd harmonics of the basic driving signal at f/2 can be generated in a manner different from the one described and shown herein with reference to the presently preferred embodiment of the invention.

The availability of a high number of additional paths in generator 4 would give the opportunity of reducing the half-amplitude width of pulses included in output signal OS to very small values and virtually to zero.

In fact, the arrangement of the invention can be somehow paralleled to a technique providing for a square wave being applied to M-Z modulator, with the advantage of allowing the relative amplitude and phases of the various components of the driving signal SW' to be adjusted independently, thus compensating for the roll-off behaviour of the frequency response of modulator 3.

Obviously, a reasonable compromise must be arrived at between the amount of pulse width reduction sought and the complexity of generator 4. Experiments by the Applicant have shown that providing even just one or two additional paths (corresponding to the third and fifth harmonic of the basic signal at frequency f/2) in generator 4 leads to thoroughly satisfactory results for most practical applications envisaged at present (pulse widths in the range of about 15 ps).

Bias controller circuit 6 provides a well-balanced pulse stream by cancelling any undesired half-rate line (when bias is not correct there are in fact "odd" and "even" pulses). Since optimum bias drifts with temperature an automatic control is needed for cancelling any undesired half-rate line in the spectrum of output signal OS. To that effect, circuit 6 includes a broadband photo detector 9, which converts the portion of output signal OS split at 7 into an electrical signal. The electrical signal generated by photo detector 9 is passed through a band pass filter 9a (this is in fact comprised of a tuned amplifier followed by a bandpass filter proper) to be then multiplied at a multiplier node 10 by the "half-rate" signal at frequency f/2 received from divider 5 via line 8.

The result of multiplication at node 10 is subsequently integrated in an integrator 11 and combined at 12 with the output signal from generator 4.

Reference numeral 13 designates a capacitor associated with the output of combiner 40 with the aim of suppressing any DC component possibly present at the output of combiner 40. The bias level of driving signal SW' applied to M-Z modulator 3 is thus precisely defined by bias controller circuit 6, avoiding any undesired offset effect.

In fact, when M-Z modulator 3 is incorrectly biased, a component at f/2 appears in the pulse spectrum. In order to cancel that component by correctly biasing modulator 3, an error signal is obtained by multiplying the detected optical pulse filtered in filter 9a centered about f/2 by the driving signal at frequency f/2 present on line 8. The integrated error signal obtained as a result of integration in integrator 11 is then fed back to the bias input of modulator 3.

Of course, the principles of the invention remaining the same, the details of construction and the embodiments may widely vary with respect to what has been described and illustrated purely by way of example, without departing from the scope of the present invention as defined by the annexed claims.

What is claimed is:

1. A method for generating optical pulses at a given repetition rate by modulating an optical signal by means of a Mach-Zehnder modulator driven by means of a driving signal including a sinusoidal component at a frequency half said given repetition rate, said method comprising:

including in said driving signal at least one odd harmonic of said sinusoidal component, generating a feedback signal from the optical pulses generated at said given repetition rate, filtering said feedback signal at said frequency half said given repetition rate, multiplying said filtered feedback signal with said sinusoidal component to generate an error signal, and biasing said Mach-Zehnder modulator on the basis of said error signal.

2. The method of claim 1, further comprising: selectively varying the relative amplitude of said at least one odd harmonic with respect to said sinusoidal component.

3. The method of claim 1, further comprising selectively varying the relative phase of said at least odd harmonic with respect to said sinusoidal component.

4. The method of claim 1, further comprising integrating said error signal to generate a bias signal for said Mach-Zehnder modulator.

5. The method of claim 1, further comprises splitting a portion of said optical pulses generated at said given repetition rate to produce a split optical signal, and converting said optical signal into an electrical signal to generate said feedback signal.

6. A system for generating optical pulses at a given repetition rate, said system comprising:

a Mach-Zehnder modulator adapted to modulate an optical signal, a drive generator for driving said Mach-Zehnder modulator by means of driving signal including a sinusoidal component at a frequency half said given repetition rate, wherein said drive generator includes circuitry for generating at least one odd harmonic of said sinusoidal component and including in said driving signal, in addition to said sinusoidal component, at least one odd harmonic of said sinusoidal component, and a bias control circuit for said Mach-Zehnder modulator, said bias control circuit including a feedback path arranged to detect in the optical pulses generated a spectral component at said frequency half said given repetition rate and to modify the bias signal applied to said Mach-Zehnder modulator to suppress said spectral component at said frequency half said given repetition rate.

7. The system of claim 6, wherein said generator circuitry comprises:
- a basic generator circuit to generate said sinusoidal component,
- at least one odd harmonic generator for generating at least one odd harmonic of said sinusoidal component,
- a main path for propagating towards said modulator said sinusoidal component, and
- at least one additional path for propagating towards said modulator said at least one odd harmonic of said sinusoidal component.

8. The system of claim 6, wherein said generator circuitry includes at least one an attenuator for selectively varying the relative amplitude of said at least one odd harmonic with respect to said sinusoidal component.

9. The system of claim 6, wherein said generator circuit includes at least one phase shifter for selectively varying the relative phase of said at least one odd harmonic with respect to said sinusoidal component.

10. The system of claim 6, wherein said bias control circuit comprises:
- a feedback unit to detect said optical pulses generated and generating therefrom a feedback signal,
- a filter for filtering said feedback signal at said frequency half said given repetition rate,
- a multiplier for multiplying said filtered feedback signal with said sinusoidal component to generate an error signal, and
- a bias control path to control the bias of said Mach-Zehnder modulator on basis of said error signal.

11. The system of claim 10, wherein said bias control path comprises an integrator to integrate said error signal used to control the bias of said Mach-Zehnder modulator.

12. The system of claim 10, wherein said feedback unit comprises an opto-electrical converter to generate said feedback signal in the form of an electrical signal derived from said generated optical pulses.

\* \* \* \* \*